US006216456B1

(12) United States Patent
Mitchell

(10) Patent No.: US 6,216,456 B1
(45) Date of Patent: Apr. 17, 2001

(54) LOAD SENSING HYDRAULIC CONTROL SYSTEM FOR VARIABLE DISPLACEMENT PUMP

(75) Inventor: John P. Mitchell, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/439,769

(22) Filed: Nov. 15, 1999

(51) Int. Cl.[7] .............................. F16D 31/02; F04B 49/00

(52) U.S. Cl. ................................ 60/452; 60/413; 60/444; 417/212; 417/213

(58) Field of Search .................................... 417/212, 213; 60/452, 413, 443, 444

(56) References Cited

U.S. PATENT DOCUMENTS

| | | | | |
|---|---|---|---|---|
| 3,732,036 | | 5/1973 | Busbey et al. | 417/216 |
| 3,947,194 | * | 3/1976 | Schlecht | 417/212 |
| 4,014,198 | * | 3/1977 | Herrmann | 72/249 |
| 4,600,364 | | 7/1986 | Nakatani et al. | 417/216 |
| 4,699,571 | | 10/1987 | Bartholomaus | 417/213 |
| 4,710,106 | | 12/1987 | Iwata et al. | 417/213 |
| 4,801,247 | | 1/1989 | Hashimoto et al. | 417/213 |
| 4,938,023 | * | 7/1990 | Yoshino | 60/427 |
| 5,060,475 | * | 10/1991 | Latimer | 30/413 |
| 5,070,695 | * | 12/1991 | Metzner | 60/448 |
| 5,073,091 | | 12/1991 | Burgess et al. | 60/222 R |
| 5,077,973 | | 1/1992 | Suzuki et al. | 60/428 |
| 5,138,838 | * | 8/1992 | Crosser | 60/433 |
| 5,245,828 | * | 9/1993 | Nakamura | 60/452 |
| 5,295,795 | | 3/1994 | Yasuda et al. | 417/213 |
| 5,447,027 | * | 9/1995 | Ishikawa et al. | 60/420 |
| 5,527,156 | | 6/1996 | Song | 417/2 |
| 5,642,616 | * | 7/1997 | Park | 60/426 |
| 5,666,806 | * | 9/1997 | Dietz | 60/327 |
| 5,743,089 | * | 4/1998 | Tohji | 60/450 |
| 5,800,130 | | 9/1998 | Blass et al. | 417/213 |
| 5,813,226 | * | 9/1998 | Krone et al. | 60/327 |
| 5,839,885 | | 11/1998 | Oda et al. | 417/213 |

* cited by examiner

*Primary Examiner*—Timothy S. Thorpe
*Assistant Examiner*—Timothy P. Solak
(74) *Attorney, Agent, or Firm*—Blackwell Sanders Peper Martin

(57) ABSTRACT

A load sensing hydraulic control system for use in a work machine and adaptable for controlling the displacement of a variable displacement hydraulic pump. The control system includes a signal duplicating valve connected in fluid communication with both the pump controller and a fluid pressure source, and a sensor positioned and located for sensing the fluid pressure to the pump controller and outputting a signal to the controller indicative thereof. In response to signals received from the at least one sensor, the controller outputs a representative signal to the signal duplicating valve indicative of the highest pressure sensed by the at least one sensor, the signal duplicating valve being thereafter operable to allow fluid flow to pass therethrough to the pump controller.

14 Claims, 2 Drawing Sheets

LOAD SENSING HYDRAULIC CONTROL SYSTEM FOR VARIABLE DISPLACEMENT PUMP

TECHNICAL FIELD

This invention relates generally to load sensing hydraulic systems and, more particularly, to a load sensing hydraulic system which utilizes an external network for transferring a load pressure signal to a variable displacement pump.

BACKGROUND ART

The demand for better controllability and efficiency in work machine operations have lead to an increasing use of load sensing hydraulic systems. Compared to conventional hydraulic systems, load sensing hydraulic systems containing variable displacement pumps are more efficient since both the pump flow and the pump pressure are continuously matched to the actual load. Load sensing valve system configurations can be derived from both conventional closed-center and open-center type valves and a wide variety of different system configurations are being used. Different valve configuration yield different operational characteristics. Regardless of the particular valve configuration being utilized, it is always difficult to produce a load signal which is indicative of the actual load and which can be communicated to the pump controller without utilizing special load sensing valve mechanisms. It is also difficult to duplicate a true high pressure load sensing signal for communication with the pump controller without having a high pressure source associated therewith.

It is therefore desirable to provide a load sensing signal to the pump controller of a variable displacement hydraulic pump without utilizing special porting or other special valve means to mechanically control such signal, and without utilizing structure such as pressure compensating valves within the main control valve network to accomplish this task. It is also desirable to provide a mechanism for reducing or scaling down a high pressure load signal to a desired lower pressure load signal which will be representative of the actual load being experienced by the hydraulic system.

Accordingly, the present invention is directed to overcoming one or more of the problems as set forth above.

DISCLOSURE OF THE INVENTION

The present invention relates to a load sensing hydraulic control system for controlling the displacement of a variable displacement pump wherein the actual load or pressure exerted against an actuating cylinder used for controlling the movement of a work element or work attachment is sensed by a pressure transducer or other sensor means and a signal representative of the actual cylinder load is communicated to an electronic controller or other processing means. The electronic controller is operable to output a signal representative of the actual cylinder load to an electrohydraulic valve which acts as a signal duplicating valve for communicating a desired load signal to a variable displacement hydraulic pump so as to continuously adjust the displacement of the pump to control pump flow and pump pressure to match the actual cylinder load. In one aspect of the present invention, a charging valve is utilized to provide a minimum pump output flow rate and pressure to the pump and an accumulator is utilized to provide a source of pressurized fluid for generating an artificial load signal to the pump controller. In another aspect of the present invention, a pilot pump operating at a predetermined pressure is utilized to provide the desired artificial load signal to the pump controller.

The present load sensing system can be utilized with a wide variety of different types of main control valves such as a plurality of proportional valves, standard three position valves, split spool type valves, and other actuating valves coupled to appropriate actuators, motors or other devices for accomplishing a particular task where load sensing capability is desirable. The present system provides load sensing capability outside of the main control valve network, which design is less expensive, it includes fewer complex components, it saves wear and tear on the pump, and it provides a separate source for matching pump performance with the actual cylinder load.

BRIEF DESCRIPTION OF THE DRAWINGS

For a better understanding of the present invention, reference may be made to the accompanying drawings in which.

BEST MODE FOR CARRYING OUT THE INVENTION

Figure 1:
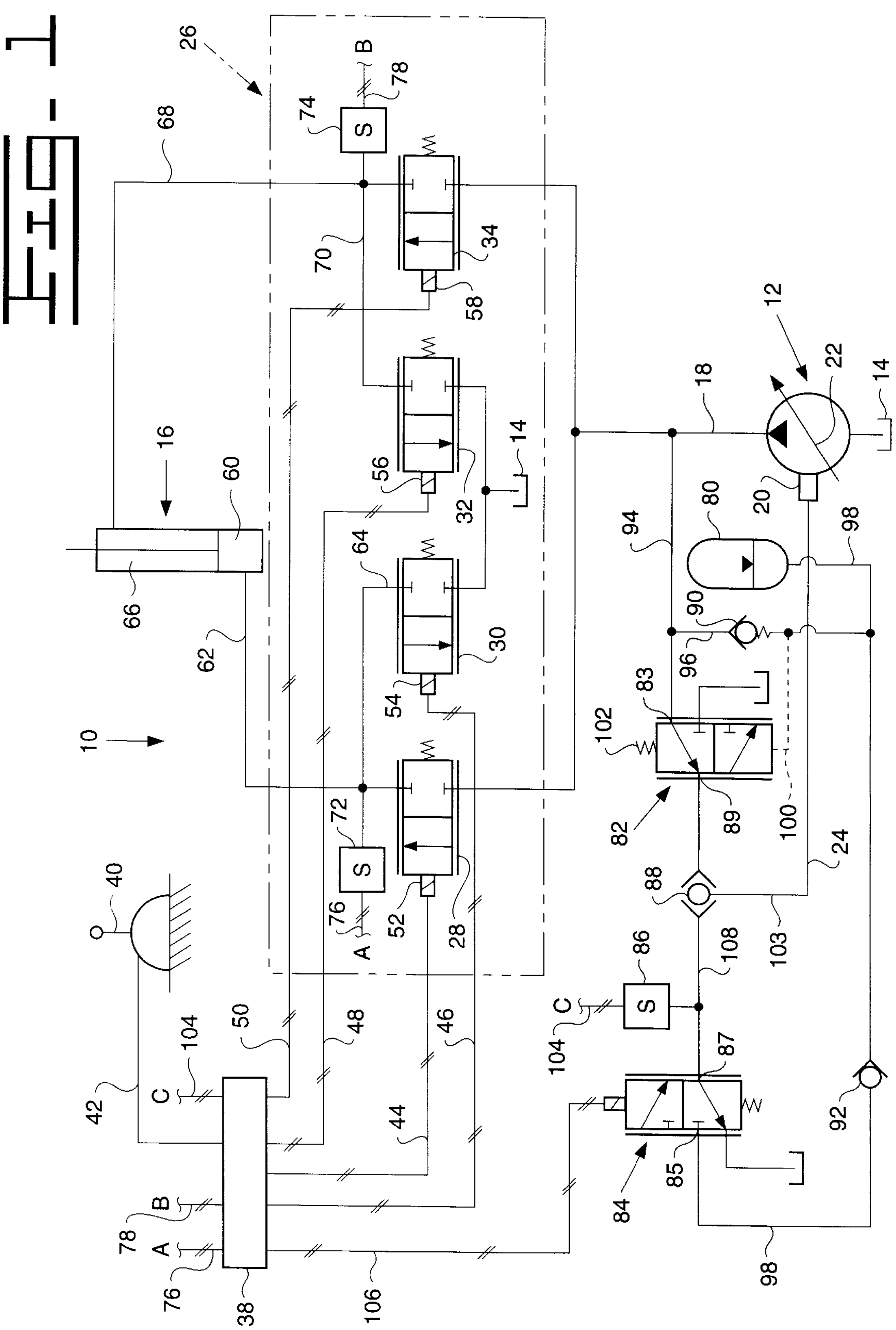
FIG. 1 is a schematic diagram of a load sensing hydraulic system constructed in accordance with the teaching of one embodiment of the present invention.

Referring to FIG. 1, a load sensing hydraulic pump pressure control system 10 is shown in combination with a variable displacement pump 12 which is connected in fluid communication with a tank 14 and a hydraulic cylinder or other work element 16 through a discharge passage 18. The hydraulic pump 12 includes a pump displacement controller 20 which is connected to a displacement control element 22, the pump controller 20 receives a load sensing signal via fluid path 24 so as to adjust the displacement control element 22 to achieve and maintain a desired fluid pressure to the actuating cylinder 16 in response to the load sensing signal. It is recognized and anticipated that the pump 12 and its associated controller 20 can take on a wide variety of different configurations depending upon the particular system application involved and the controller 20 may include a spring or some other biasing mechanism which will resiliently bias the displacement control element 22 to either its maximum or minimum displacement setting. The pump 12 will adjust the displacement control element 22 in response to the load sensing signal received via fluid path 24 in order to achieve a desired fluid flow through the discharge passageway 18.

In the embodiment illustrated in FIG. 1, a main control valve mechanism 26 for controlling the operation of the actuating cylinder 16 includes four separate proportional electrohydraulic valves 28, 30, 32 and 34, which valves move the actuating cylinder 16 incrementally based upon signal inputs from an electronic controller or processor 38. Each valve 28, 30, 32 and 34 is electrically controlled via processor or controller 38 based upon operator commands inputted to processor 38 via an operator control mechanism 40 such as one or more control levers or joysticks associated with a particular work machine. Movement of the operator input device 40 outputs appropriate signals to controller 38 via conductive path 42 and, based upon such input signals 42, controller 38 controls the operation of proportional valves 28, 30, 32 and 34 by outputting appropriate signals via conductive paths 44, 46, 48 and 50 to the solenoids or other electrical actuator means 52, 54, 56 and 58 associated respectively therewith. In this regard, valve 28 controls fluid flow from pump 12 via discharge passage 18 to the head portion 60 of actuating cylinder 16 via fluid path 62; valve 30 controls the discharge of fluid from the head end portion 60 of actuating cylinder 16 to tank 14 via fluid paths 62 and 64; valve 32 controls the discharge of fluid from the rod end portion 66 of actuating cylinder 16 to tank 14 via fluid paths 68 and 70; and valve 34 controls fluid flow from pump 12 to the rod end portion 66 of actuating cylinder 16 via fluid paths 18 and 68.

Control valves 28–34 operate in a conventional manner such that when the operator commands the actuating cylinder 16 to extend via operator input device 40, the controller or processor 38 outputs appropriate signals to close valves 30 and 34 and open valves 28 and 32 thereby allowing fluid flow from pump 12 to travel through valve 28 to the head end portion 60 of actuating cylinder 16 causing the cylinder to extend. As cylinder 16 extends, the fluid present in the rod end portion 66 is allowed to return to tank 14 through valve 32. In a similar manner, if the operator commands the actuating cylinder 16 to retract via operator input device 40, the controller or processor 38 will output appropriate signals to close valves 28 and 32 and open valves 30 and 34 such that fluid flow will be directed through valve 34 to the rod end portion 66 of actuating cylinder 16 thereby causing the cylinder to retract. As cylinder 16 retracts, the fluid present in the head end portion 60 is allowed to return to tank 14 through valve 30. Pressure sensors 72 and 74 are coupled respectively to fluid paths 62 and 68 and sense the fluid pressure being exerted against the head and rod end portions of the actuating cylinder 16 respectively. When the actuating cylinder 16 is under load, the pressures sensed by sensors 72 and 74 represent the actual cylinder load. This actual cylinder load or pressure is communicated to controller or processor 38 from the respective sensors 72 and 74 via conductive paths 76 and 78 respectively. As a result, controller or processor 38 continuously receives a load sensing signal indicative of the actual load or pressure associated with actuating cylinder 16.

The present pump load sensing control system 10 further includes an accumulator 80, a charging valve 82, another electrohydraulic valve 84, another pressure sensor 86, a resolver 88, and a pair of check valves 90 and 92 as illustrated in FIG. 1. These components form an external network separate and apart from the main control valve mechanism 26 for providing a desired load sensing signal to pump 12 as well be hereinafter explained. The accumulator 80 is provided as a pressure source for providing fluid flow through valve 84; charging valve 82 is provided to insure that a minimum pressure load is set for pump 12; and the electrohydraulic valve 84 is provided as a signal duplicating valve so that an artificial load signal of lower pressure can be provided to the pump controller 20 to control and regulate the fluid pressure to the actuating cylinder 16 based upon the actual cylinder load being sensed by sensors 72 and 74. In this regard, accumulator 80 is connected in fluid communication with the inlet port 85 of valve 84 via fluid path 98 and the outlet port 87 of valve 84 is connected in fluid communication with pump controller 20 via fluid paths 108, 103 and 24. The charging valve 82 has an inlet port 83 connected in fluid communication with pump 12 and the accumulator 80 and an outlet portion 89 connected in fluid communication through resolver 88 with the pump controller 20. Charging valve 82 is provided for use only during the initial charging of accumulator 80 as will be hereinafter explained.

Accumulator 80 is initially charged by pump 12 via fluid paths 94, 96 and 98. While accumulator 80 is charging to a predetermined charge pressure, fluid will flow through check valve 90 to accumulator 80 as well as through fluid path 94 to the charging valve 82. Fluid will continue to flow through charging valve 82 and through resolver 88 back to the pump controller 20 via fluid paths 103 and 24. As accumulator 80 is being charged, a pressure signal is being provided to charging valve 82 via fluid path 100. When accumulator 80 is charged to a predetermined charge pressure, the pressure signal provided to charging valve 82 via fluid path 100 acts against the spring or biasing means 102 of valve 82 to close valve 82 at fluid path 94. In this regard, the spring or biasing mechanism 102 will be set so as to close valve 82 when accumulator 80 is charged to a predetermined charge pressure. When valve 82 closes, no fluid flow via flow path 94 will reach resolver 88 and accumulator 80 will be providing fluid flow to valve 84 for use as will be hereinafter explained. The load signal inputted to pump controller 20 via fluid paths 103 and 24, once charging valve 82 closes and while system 10 is operating under a no load condition will be a signal representative of some minimum pump output flow level. Charging valve 82 therefore sets pump 12 at some minimum predetermined flow and pressure level based upon the predetermined charge pressure of accumulator 80 which will close valve 82. This minimum flow and pressure level of pump 12 can be changed by changing the predetermined charge pressure of accumulator 80 which will close valve 82. Once charging valve 82 closes, accumulator 80 will be constantly charged by pump 12 via fluid paths 94, 96 and 98.

When the operator inputs a signal to controller 38 via input device 40 to control the operation of actuating cylinder 16, sensor 72 or 74 will sense the actual load pressure being exerted on actuating cylinder 16 depending upon whether the cylinder is being extending or retracted, and such load sensing signal will be communicated to controller 38 as previously explained. Based upon the actual load condition of cylinder 16, controller 38 will output a signal to valve 84 via conductive path 106 so as to incrementally open valve 84 thereby allowing fluid under pressure from accumulator 80 to flow therethrough via flow paths 108, 103 and 24 to pump controller 20. This fluid flow from valve 84 to pump controller 20 is an artificial load sensing signal designed to match the actual load or pressure being experienced by actuating cylinder 16 as communicated via sensors 72 and 74. In this regard, controller 38 will output a signal to valve 84 representative of the highest load pressure being sensed by sensors 72 and 74.

Controller 38 is programmed to output an appropriate signal to valve 84 to proportionately open valve 84 so as to provide an appropriate load sensing signal to pump controller 20 to either increase or decrease the flow pressure to actuating cylinder 16 so as to match the load. In this regard, the pressure sensor 86 positioned in communication with flow path 108 will continuously output a signal to controller 38 indicative of the load sensing pressure being inputted to pump controller 20. When such load sensing signal reaches the appropriate desired pressure level as programmed into controller 38, controller 38 will output an appropriate signal to valve 84 to incrementally control such valve so as to maintain the appropriate load sensing signal to pump controller 20. In other words, valve 84 will hover and maintain the appropriate load sensing signal to match the actual cylinder load in response to signals inputted to controller 38 from sensors 72 and 74. The load sensing signal being provided through valve 84 is a signal which produces a substantially reduced pressure flow to pump controller 20 as compared to the actual operating pressures being exerted on actuator cylinder 16. Electrohydraulic valve 84 therefore acts as a signal duplicating valve which, in conjunction with accumulator 80, provides a more desirable pressure reduced load sensing signal to pump controller 20.

When hydraulic system 10 is under load, accumulator 80 will be constantly charged by pump 12 via flow paths 94, 96 and 98 and charging valve 82 will remain closed. Charging valve 82 is only operational during initial charging of accumulator 80. As a result, the load sensing signal provided to pump controller 20 via valve 84 will always be a representative signal to match the load or pressure being experienced by cylinder 16 and such signal will be a reduced pressure signal controlled by controller 38 via inputs from pressure sensor 86. Check valve 92 is provided in flow path 98 so as to prevent any feed back flow to accumulator 80.

Figure 2:
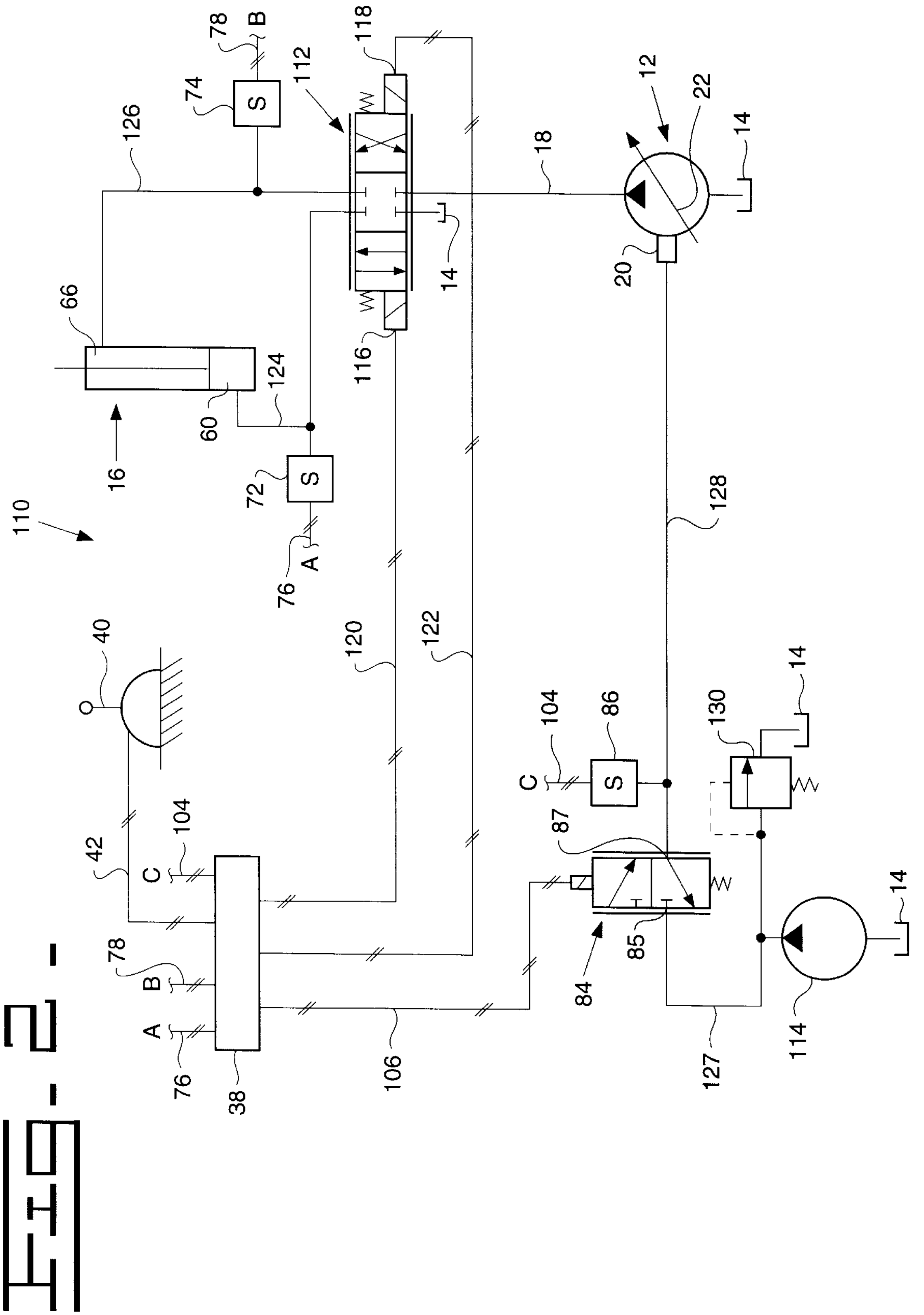
FIG. 2 is a schematic diagram of a load sensing hydraulic system constructed in accordance with the teachings of another embodiment of the present invention.

FIG. 2 illustrates another load sensing pump control system 110 wherein the proportional control valves 28, 30, 32 and 34 have been replaced with a conventional three position valve 112 and wherein the accumulator 80, charging valve 82, resolver 88, check valve 90 and the plumping associated with such components have been replaced by a pilot pump 114 operating at a predetermined pressure. In all other respects, the load sensing pressure control system 110 illustrated in FIG. 2 operates in substantially the same manner as previously described with respect to the control system 10 illustrated in FIG. 1.

For example, based upon an operator command inputted through operator input device 40, the controller or processor 38 will output an appropriate signal to the actuating solenoids or other actuating means 116 and 118 associated with valve 112 via conductive paths 120 and 122 to control movement of the actuating cylinder 16 in the appropriate direction. If valve actuating means 118 is actuated, fluid flow from pump 12 will be directed to the head portion 60 of actuating cylinder 16 via fluid paths 18 and 124 so as to extend the cylinder 16 and fluid present in the rod end portion 66 will be allowed to exit and travel to tank 14. In similar fashion, if valve actuating means 116 is actuated, fluid flow from pump 12 via fluid path 18 will be allowed to travel to the rod end portion 66 of actuating cylinder 16 via fluid paths 18 and 126 so as to retract the cylinder and any fluid present in the head portion 60 will be allowed to exit and travel to tank 14. Here again, pressure sensors 72 and 74 are coupled respectively to fluid paths 124 and 126 and sense the actual load or pressure being exerted on actuating cylinder 16. Sensors 72 and 74 likewise continuously communicate with controller 38 and input signals thereto via control paths 76 and 78 indicative of the actual load or pressure being experienced by cylinder 16. Based upon these actual load sensing signals, controller 38 outputs an appropriate signal via conductive path 106 to the signal duplicating valve 84 to again send a desired load sensing signal of reduced pressure to pump controller 20 via fluid path 128 to again adjust and change the pump displacement control element 22 so as to output the necessary flow to match the actual load or pressure being exerted against actuating cylinder 16.

Instead of accumulator 80 (FIG. 1) providing the fluid flow source to valve 84, a pilot pump 114 connected in fluid communication with valve 84 via fluid path 127 is provided to accomplish this task. Pilot pump 114 operates at a predetermined pressure which is preferably lower than the operational pressure provided to actuating cylinder 16 via pump 12, and further provides a reduced pressure or artificial load sensing signal via fluid path 128 to pump controller 20 when proportional valve 84 is incrementally actuated. Here again, the signal outputted by controller 38 to valve 84 will be a representative signal to adjust the displacement of pump control element 22 to match the highest actual load or pressure being sensed by sensors 72 and 74 and pressure sensor 86 will communicate this representative pressure signal to controller 38 via conductive path 104. A relief valve 130 is provided to control the maximum fluid pressure to valve 84 via fluid path 127. Here again, as the actual load or pressure to actuating cylinder 16 changes, such actual load changes are communicated to controller 38 via sensors 72 and 74, and controller 38 will output an appropriate signal to valve 84 to provide a desired load sensing signal to pump controller 20.

This embodiment further reduces the number of components used in the external network to provide the desired load sensing signal and it provides a more controllable mechanism for providing fluid flow to valve 84 since the output flow and pressure from pilot pump 114 to valve 84 can be easily established and maintained.

INDUSTRIAL APPLICABILITY

As described herein, the present load sensing hydraulic control system has particular utility in a wide variety of different applications including utility in a wide variety of different work machines and other vehicles wherein actuating cylinders, motors, or other actuators or work elements are being controlled by one or more variable displacement hydraulic pumps, and wherein load sensing capability is desirable. In the present load sensing system, an artificial load sensing signal of reduced pressure is provided to the pump controller so as to change the output flow from the pump to match the actual load or pressure being exerted against the actuating cylinder 16 or some other work element. This arrangement reduces the wear and tear on the variable displacement pump and provides an improved pressure control system which is separate and apart from the main control valve structure such as the valves 28–34 illustrated in FIG. 1 and valve 112 illustrated in FIG. 2. As a result, the pump controller 20 is responsive to the actual load or control pressure being exerted against actuating cylinder 16.

Although there has been illustrated and described herein two specific embodiments of a load sensing control system for use with a variable displacement hydraulic pump incorporating the principles of the present invention as illustrated in FIGS. 1 and 2, it is clearly understood that the hydraulic system embodiments of FIGS. 1 and 2 are merely for purposes of illustration only and that changes and modifications may be readily made to the overall circuit configuration by those skilled in the art without departing form the sprit and scope of the present invention. For example, besides being operable with a plurality of proportional electrohydraulic valves such as valves 28-34 (FIG. 1), or a conventional three position control valve 112 (FIG. 2), it is recognized and anticipated that the present load sensing control system can be utilized with a wide variety of other types of main control valves such as split spool type valves and the like. Also, importantly, it is also recognized and anticipated that the present load sensing system could be coupled to a plurality of different main control valves, the signal duplicating valve 84 being controlled in response to the highest actual load or pressure being sensed by any one of a plurality of pressure sensors such as sensors 72 and 74.

Still further, the various pressure sensors 72, 74 and 86 used in the present control systems are well known in the art and a wide variety of different types of pressure sensors may be utilized. It is also recognized and anticipated that other means and methods may be used to determine the flow pressures associated with the actuating cylinder 16 via fluid paths 62/124 and 68/126 and with the pump 12 via fluid path 18.

It is also recognized that electronic controllers or processors such as controller 38 are commonly used in association with a wide variety of hydraulic systems, particularly in work machines, for accomplishing various tasks. Controller 38 may typically include processing means such as a microcontroller or microprocessor, associated electronic circuitry such as input/output circuitry, analog circuits or programmed logic arrays, as well as associated memory. Controller or processor 38 can therefore be programmed to sense and recognize the appropriate signals indicative of the various pressure conditions being sensed by sensors 72 and 74 and, based upon such sensed conditions, controller or processor 38 will provide appropriate output signals to valve 84 to control the output flow of the variable displacement pump 12.

Other aspects, objects and advantages of the present invention can be obtained from a study of the drawings, the disclosure and the appended claims.

What is claimed is:

1. A load sensing hydraulic control system for use in a work machine and adaptable for controlling the displacement of a variable displacement hydraulic pump wherein the pump includes a pump controller and a pump control element, the control system comprising:

at least one actuating cylinder for controlling the movement of a work element, said actuating cylinder having a head end portion and a rod end portion;

at least one control valve connected in fluid communication with the head and rod end portions of said actuating cylinder for controlling the operation thereof;

a first sensor positioned in fluid communication with said at least one control valve and the head end portion of said actuating cylinder for sensing the fluid pressure in the head end portion of said actuating cylinder, said sensor outputting a signal indicative of the load being exerted against the head end portion of said actuating cylinder;

a second sensor positioned in fluid communication with said at least one control valve and the rod end portion of said actuating cylinder for sensing the fluid pressure in the rod end portion of said actuating cylinder, said sensor outputting a signal indicative of the load being exerted against the rod end portion of said actuating cylinder;

a controller coupled to said first and second sensors for receiving signals therefrom, said controller being operable to receive a signal from said first sensor indicative of the load being exerted against the head end portion of said actuating cylinder and a signal from said second sensor indicative of the load being exerted against the rod end portion of said actuating cylinder;

a signal duplicating valve having an inlet port and an outlet port, the outlet port connected in fluid communication with the pump controller;

a fluid pressure source connected in fluid communication with the inlet port of said signal duplicating valve; and a third sensor positioned in fluid communication with the outlet port of said signal duplicating valve and the pump controller for sensing the fluid pressure to the pump controller, said third sensor outputting a signal to said controller indicative of the fluid pressure being communicated to the pump controller;

said controller outputting a signal to the signal duplicating valve in response to the signals received from said first and second sensors, said output signal being a representative signal indicative of the highest pressure sensed by said first and second sensors;

said signal duplicating valve being operable to allow fluid flow to pass therethrough from said pressure source to the pump controller in response to said signal outputted from said controller, the fluid flow from said signal duplicating valve to the pump controller being a load sensing signal operable to enable the pump controller to adjust the position of the pump control element to match the highest pressure being sensed by said first and second sensors.

2. The load sensing hydraulic control system as set forth in claim 1 wherein said controller maintains the appropriate load sensing signal to the pump controller by continuously monitoring the signal from said third sensor and adjusting the output signal to said signal duplicating valve to maintain a desired pressure.

3. The load sensing hydraulic control system as set forth in claim 1 wherein said fluid pressure source includes a pilot pump connected in fluid communication with the inlet port of said signal duplicating valve, said pilot pump being operable at a predetermined pressure.

4. The load sensing hydraulic control system as set forth in claim 3 wherein the predetermined operating pressure of said pilot pump is less than the maximum operating pressure of said actuating cylinder.

5. The load sensing hydraulic control system as set forth in claim 3 including a pressure relief valve connected in fluid communication with said pilot pump and with the inlet port of said signal duplicating valve, said pressure relief valve being operable to open when the fluid flow to the inlet port of said signal duplicating valve reaches a predetermined pressure.

6. The load sensing hydraulic control system as set forth in claim 1 wherein said pressure source includes an accumulator connected in fluid communication with the pump and with the inlet port of said signal duplicating valve.

7. The load sensing hydraulic control system as set forth in claim 6 including a check valve positioned in fluid communication with the inlet port of said signal duplicating valve and said accumulator for preventing fluid flow from the inlet port of said signal duplicating valve to said accumulator.

8. The load sensing hydraulic control system as set forth in claim 6 wherein said control system includes a charging valve having an inlet port and an outlet port, the inlet port of said charging valve being connected in fluid communication with the pump and with said accumulator, the outlet port of said charging valve being connected in fluid communication with the pump controller, said charging valve being operable to close when said accumulator reaches a predetermined pressure, said charging valve being further operable to provide a load sensing signal to the pump controller to establish a minimum flow level for the pump under a no load condition.

9. The load sensing hydraulic control system as set forth in claim 8 including a check valve positioned in fluid communication with said pump, the inlet port of said charging valve, and said accumulator for preventing fluid flow from the accumulator to the pump and to the inlet port of said charging valve.

10. A load sensing hydraulic control system for use in a work machine and adaptable for controlling the displacement of a variable displacement hydraulic pump wherein the pump includes a pump controller and a pump control element, the control system comprising:

at least one actuating means for controlling the operation of a work element;

at least one control valve connected in fluid communication with said actuating means for controlling the operation thereof;

at least one sensor positioned in fluid communication with said at least one control valve and said actuating means for sensing fluid pressure to said actuating means, said at least one sensor outputting a signal indicative of the load being exerted against said actuating means;

a controller coupled to said at least one sensor for receiving signals therefrom, said controller being operable to receive a signal from said at least one sensor indicative of the load being exerted against said actuating means;

a signal duplicating valve having an inlet port and an outlet port, the outlet port being connected in fluid communication with the pump controller;

a fluid pressure source connected in fluid communication with the inlet port of said signal duplicating valve; and a sensor positioned in fluid communication with the outlet port of said signal duplicating valve and the pump controller for sensing the fluid pressure to the pump controller, said sensor outputting a signal to said controller indicative of the fluid pressure being communicated to the pump controller;

said controller outputting a signal to the signal duplicating valve in response to the signals received from said at least one sensor, said output signal being a representative signal indicative of the highest pressure sensed by said at least one sensor;

said signal duplicating valve being operable to allow fluid flow to pass therethrough from said fluid pressure source to the pump controller in response to said signal outputted from said controller, the fluid flow from said signal duplicating valve to the pump controller being a load sensing signal operable to enable the pump controller to adjust the position of the pump control element to match the highest pressure being sensed by said at least one sensor.

11. The load sensing hydraulic control system as set forth in claim 10 wherein said controller maintains the appropriate load sensing signal to the pump controller by continuously monitoring the signal from the sensor positioned in communication with the outlet port of said signal duplicating valve and the pump controller and adjusting the output signal to said signal duplicating valve to maintain a desired pressure.

12. The load sensing hydraulic control system as set forth in claim 10 wherein said fluid pressure source connected in fluid communication with the inlet port of said signal duplicating valve includes an accumulator connected in fluid communication with the pump and with the inlet port of said signal duplicating valve.

13. The load sensing hydraulic control system as set forth in claim 10 wherein said fluid pressure source connected in fluid communication with the inlet port of said signal duplicating valve includes pilot pump connected in fluid communication with the inlet port of said signal duplicating valve, said pilot pump being operable at a predetermined pressure.

14. The load sensing hydraulic control system as set forth in claim 10 wherein said at least one actuating means includes a hydraulic cylinder.

* * * * *